United States Patent [19]

Penn et al.

[11] Patent Number: 5,126,977
[45] Date of Patent: Jun. 30, 1992

[54] OPTICAL CALIBRATION OF WIDE APERTURE ARRAY

[75] Inventors: William A. Penn, Baldwinsville; James W. Stauffer, Chittenango, both of N.Y.

[73] Assignee: General Electric Company, Syracuse, N.Y.

[21] Appl. No.: 629,139

[22] Filed: Dec. 18, 1990

[51] Int. Cl.$^5$ .............................................. G01S 15/00
[52] U.S. Cl. ...................................... 367/128; 367/13
[58] Field of Search ................. 367/128, 13, 106, 130, 367/19; 73/1 DV

[56] References Cited

U.S. PATENT DOCUMENTS 4,376,301  3/1983  Roberts ............................. 367/130

Primary Examiner—Daniel T. Pihulic
Attorney, Agent, or Firm—Paul Checkovich; Geoffrey Krauss

[57] ABSTRACT

A wide-aperture array, used to sonically measure range to a source, is calibrated by providing a beam of optical energy from a first location, rigidly affixed to a first end sensor of a trio of array sensors, through a lens at a second location rigidly affixed to a middle one of the trio of sensors, to an optical sensor of the retinal type at a third location, rigidly affixed to the remaining sensor, at the opposite end of an initially straight line from the first sensor, and then measuring the deviation of the beam at the retinal sensor due to deviation of the sensors from positions on a straight line. The wavefront curvature found for any energy received by the array sensors is corrected by the measured deviation.

20 Claims, 2 Drawing Sheets

OPTICAL CALIBRATION OF WIDE APERTURE ARRAY

FIELD OF THE INVENTION

The present invention relates to propagating energy detection-beam forming systems and, more particularly, to a novel method and apparatus for calibration (i.e., detecting deviations from a fixed alignment) of a wide-baseline array of energy transducers meant to provide wavefront curvature measurement such that curvature of the baseline of the array can be optically sensed and corrected for, to reduce array inaccuracy.

BACKGROUND OF THE INVENTION

It is now well-known to utilize a wide-baseline, or wide-aperture, array of sensors, such as in a passive sonar system, to measure the range from the sensor array to an emitting source. While range can be determined by echo timing in the active case, in the passive case no echo exists and so range must be calculated from the curvature of the arriving sound energy wavefront. Differences in some characteristic of this arriving sonic wavefront must be measured with a high degree of accuracy; this is equivalent to finding the "best focus" with range as a variable parameter. Normally, only three sensors are required for estimating this curvature and thus finding the range to the source, assuming that the sensors lie at known distances along a curve with a precisely known set of characteristics; most typically, the sensors lie at equal distances along a straight line, for simplicity of calculation. However, it is well-known that minor deviations from a straight line can be expected due to various stresses and strains placed upon the structure supporting the three sensors, especially when that structure is in a dynamic condition, e.g. the hull of a vessel moving through the water. Thus, where a trio of sonar sensors are placed upon a ship hull, and used to passively receive sonar information for estimating the range of the sonar source, relatively small flexure of the hull can result in relatively large range estimation errors. It is therefore highly desirable to provide a method of, and apparatus for, estimating flexure of a substantially-rigid body holding a trio of sensors, and for using the flexure information thus obtained to reduce potential error in the resulting measurements.

BRIEF SUMMARY OF THE INVENTION

In accordance with the invention, a method for optical calibration of a wide-aperture array, used to sonically measure range to a source, utilizes the steps of: providing a beam of optical energy from a first location, rigidly affixed to a first end sensor of a trio of array sensors, through a lens at a second location rigidly affixed to a middle one of the trio of sensors, to an optical sensor of the retinal type at a third location, rigidly affixed to the remaining sensor, at the opposite end of an initially straight line from the first sensor; measuring the deviation of the beam at the retinal sensor due to deviation of the sensors from positions on a straight line; and modifying the curvature found for any energy received by the array sensors by the measured deviation to correct the range thus found. In an elongated linear array of more than three sensors, only the two end sensors and a sensor substantially at the midpoint there between, need be used.

In a presently preferred embodiment, the beam source can be at least one LED or laser diode, the lens can be simple or compound (as necessary to provide the required focal length) and the retinal detector can be an optical sensor apart, such as a charge coupled device (CCD) or charge injection device (CID) planar array. All of the optical elements can be placed in a common tube to exclude external light energy. Disturbances in the straight-line positioning of the optical elements can be accommodated by offsetting elements, such as pairs of rigidly-separated mirrors, set for rotation about a common axis.

Accordingly, it is an object of the present invention to provide a novel method and apparatus for optically calibrating the amount of flexure error in a wide-aperture array utilized to measure range, and for substantially reducing errors in range due to flexure error.

This and other objects of the present invention will become apparent to those skilled in the art upon reading the following detailed description, when considered in conjunction with the drawings.

DETAILED DESCRIPTION OF A PRESENTLY PREFERRED EMBODIMENT OF THE INVENTION

Figure 1:
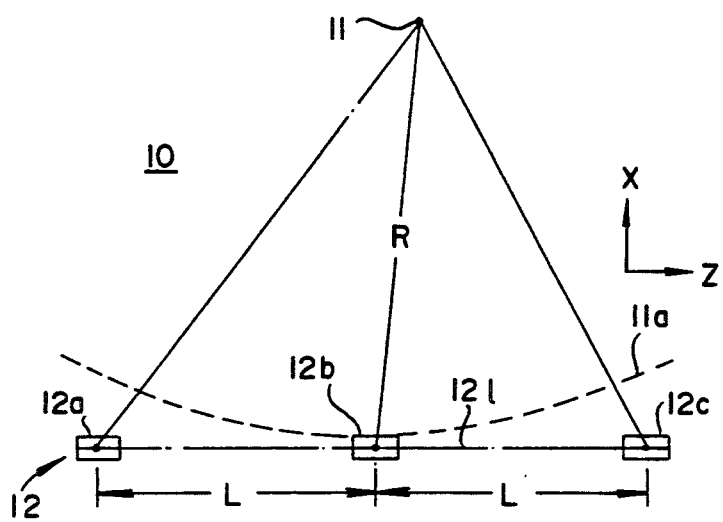
FIG. 1 is a plan view of an array of a trio of sensors, and of a source of energy at a range to be measured by the array.
Figure 2:
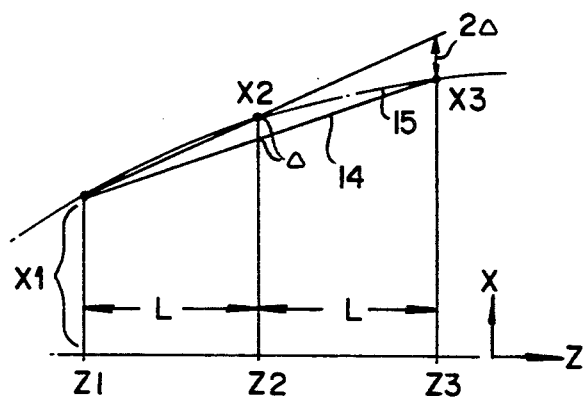
FIG. 2 is a simplified representation of the sensors, and illustrating array curvature and other factors of interest in the present invention.

Referring initially to FIGS. 1 and 2, an acoustic sensing system 10 is provided for determining the range R to a distant source 11 of energy, e.g. sound, by measuring the curvature of an arriving energy (sound) wavefront 11a with a wide-baseline, or wide-aperture, array 12 of (sound) energy sensors. The array must have at least three sensors 12a/12b/12c; each sequential pair of sensors 12a/12b or 12b/12c is separated by the same distance L and all three sensors initially lie on the same straight line 12L. The straightness of line 12L is measured and established before system 10 is used in a dynamic environment, in which curvature of the baseline 12L is normally expected and must be compensated for, as by use of the present invention.

Curvature is defined as a rate-of-change of a unit tangent vector, as a function of distance along a curved path. Constant curvature implies a circle, and is, in fact, the value of the curvature of said circle is the reciprocal of the radius-of-curvature of the circle matched in its position and its first two spatial derivatives to the curve at the point of interest. In the case of a wavefront from the point target 11, the curve is a circle of radius R, where R is the range to the target from the region of wavefront evaluation, which evaluation region is approximated by the short length 2L of the array, relative to the range R. If the slope of wavefront 11a is much less than unity, then the curvature U is also approximately the second derivative of the curve deflection (in the X direction) with respect to the tangent coordinate (in the Z direction). This can be verified by postulating a circle of radius R centered on the origin in the Z-X plane and having an equation of $Z^2+X^2=R^2$. The second derivative of X with respect to Z, for the value $Z=0$, is $-1/R$.

The acoustic wavefront curvature $U_a$ can therefore be defined to be the reciprocal of the range, or $$U_a = 1/R. \tag{1}$$

A parabolic approximation for wavefront 11a is assumed to be valid for small slopes, and if the values of the X coordinates are known at the three equally spaced points along the Z axis (e.g. at a first point Z1, where the phase center of the first sensor 12a is located; at a second point Z2, where the phase center of the second sensor 12b is located; and at a third point Z3, where the phase center of the third sensor 12c is located), the acoustic curvature $U_a$ can be found from this data. The spacing L is known, and it is assumed that the three X coordinate values x1, x2 and x3 can be measured. The curvature is now obtained by constructing the second difference in X, referenced to the spacing, which in the parabolic approximation, and with proper normalization to the spacing L, produces the desired second derivative. The required second difference is the difference between the first two differences for each adjacent pair and is thus given by $$U_a = \frac{1}{L}\left[\frac{x_2 - x_1}{L} - \frac{x_3 - x_2}{L}\right] \tag{2a}$$

$$U_a = \frac{1}{L^2}[2x_2 - [x_1 + x_3]] \tag{2b}$$

which is $$U_a = 2\Delta_a/L^2 \tag{2}$$

where $\Delta_a$ is the difference in the X dimension between the center point $X_2$ and a chord 14 connecting the two outer points $X_1$ and $X_3$, as shown in FIG. 2.

Acoustically, this data is obtained from measurement of the acoustic phase at each of sensors 12a/12b/12c. Thus, if acoustic wavelength $\Delta_a$ and the acoustic wave number $k_a = 2\pi/\Delta_a$, then wavefront 11a has a curvature $U_a$ which can be represented by:

$$U_a = \frac{1}{L^2 \cdot k_a}[2 \cdot \phi_2 - [\phi_1 + \phi_3]] \tag{3}$$

where $\phi_1$, $\phi_2$ and $\phi_3$ are measured phase at the phase centers of sensors 12a, 12b and 12c, respectively.

Target range R is then found from equation 1, as a reciprocal of equation 3. It will be seen that the acoustic measurement of curvature is predicated on an alignment of the phase centers of the three acoustic sensors so that they lie precisely on a straight line. If there is any deviation of the sensor positions from the straight line condition, this deviation will cause the equivalent of a mechanical curvature $U_m$, corresponding to the parabolic axis 15 which connects the phase centers. This mechanical curvature is $U_m = 2\Delta_m/L^2$, where $\Delta_m$ is the difference in the X dimension between the mechanical location of the center sensor and the mechanical chord connecting the two outer sensor phase sensors.

Thus, the wavefront curvature, as perceived by the acoustic phase measurements $U_a$, will be different than the real curvature U by an amount equal to the mechanical curvature $U_m$, so that $$U = U_a - U_m. \tag{4}$$

If the wavefront curvature is small, corresponding to a large range R, a slight mechanical error $U_m$ will be proportionately large, resulting in a similar proportional error in range R. It is important, especially for the measurement of large range, to accurately correct for mechanical error. The problem solved by the present invention is thus to measure the second difference of the mechanical phase center positions with high accuracy.

Figure 3:
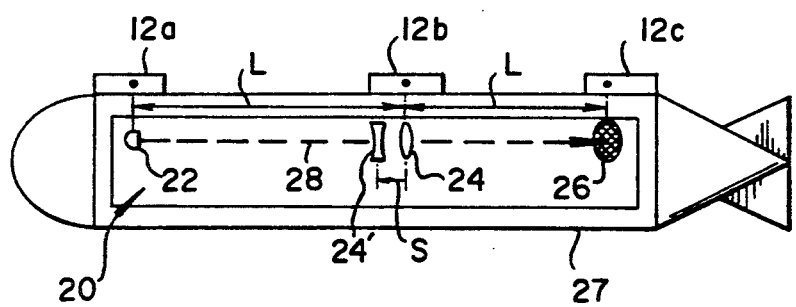
FIG. 3 is a schematic side view of a ship hull bearing the trio of sensors of the array, and of an apparatus in accordance with the invention for performing optical calibration to determine array curvature and to remove the effects thereof from range determination.
Figure 4:
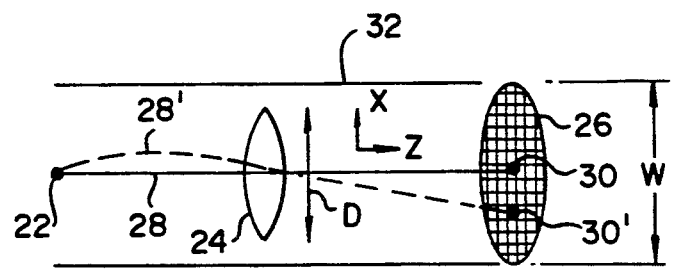
FIG. 4 is a exaggerated schematic view of the optical components utilized in the apparatus of the present invention.

Referring now to FIGS. 3 and 4, mechanical second difference, or curvature $U_m$ information can be measured with an optical subsystem 20, in which a point-like source 22 is rigidly mounted to the first acoustic sensor 12a at its phase center (here positioned near the front of a vessel). An imaging lens means 24 is rigidly mounted to the phase center of the second acoustic sensor 12b, which may be positioned amidships of the vessel hull. An optical detector of means 26, which may be a retinal array of a plurality of pixels such as in a CID, CCD and other like imaging means, is rigidly mounted to the phase center of the third acoustic sensor 12c, which may itself be positioned near the aft end of the sea vessel 27. The spacings between these three elements 22/24/26 are two substantially equal lengths L. The light source 22 provides a beam 28 which passes through lens 24 and is imaged onto the retinal array 26; advantageously, the resulting image spot 30 spans several pixels in the retinal array 26.

As seen in FIG. 4, if the vessel flexes or is otherwise distorted in shape, the image spot 30' moves to a new position on retina 26 and this new position provides XY axial position data which provides an accurate measure of the curvature of the axis 28' which passes through the three sensor reference points, that is, the second position difference. Thus, position of new spot 30' on the output retina array 26 can be directly utilized as a correction to the perceived wavefront curvature from the source 11, to reduce or eliminate the effects of vessel distortion. It will be seen that the optical elements 22, 24 and 26 must be rigidly fixed to the acoustic sensor phase centers. In the case where these optical elements are mounted on the inside of the vessel, the optical subsystem 20 requires that the various portions of the vessel are all rigid enough so that no change due to ambient conditions and resulting vessel hull distortion occurs in the distance between each opticallement and its associated acoustic sensor (e.g., the structural ribs, pressure hull, acoustic sensor mounting brackets, mounting isolator and the like).

The optical system shown in FIG. 4 has a mechanical curvature which is exaggerated for the purposes of clarity. It should be noted that the beam offset position 30' is shown only for curvature in the horizontal, or X-axis, direction, although it should be immediately apparent to those skilled in the art that array output position information is in fact two-dimensional and will also provide information as to vertical, or Y-axis, curvature simultaneously with the illustrated horizontal X-axis curvature information. Thus, the image spot 30' in the plane of output array 26 is located by the here-distorted central optical ray 28', which commences at light source 22, passes through lens 24 and ends at an output position corresponding to the X and Y values, of offset $2\Delta_m$, as further illustrated in FIG. 2. The output position will directly represent the second-difference quantity.

In a typical example, the spacing L between the acoustic sensors is about 20–25 meters. The diameter of the imaging lens 24 need not be very large and might be only several centimeters to provide the required performance. The light source can be a light-emitting diode (LED) or a CW laser diode if additional brightness is required. In order to enhance the effective brightness of source 22, the entire optical system 20 can be encased in a light-excluding shroud 32 of tubular or other shape.

If an obstruction eliminates any practical way of providing a clear line-of-sight, even with angular deviations, such an obstruction can be accommodated if it is rigid. Retinas can be placed on both sides of the obstruction, with telescopic imaging lenses in front of each retina, all rigidly connected to the obstruction. Curvature can be measured by finding the spot location on both sides of this configuration, and taking the difference between the two values. This scheme can also accommodate multiple obstructions with multiple stages of the configuration described.

The required long focal length of the imaging lens can be obtained from lenses with shorter, more commonly available focal lengths. By placing a convex lens 24 and concave lens 24' with focal lengths of equal but opposite polarity, an adjustable compound lens is created. The effective focal length $F_E$ of the combination can be shown to be:

$$F_E = \frac{F^2}{S} \quad (5)$$

where F is the focal length magnitude of each individual lens (i.e., $+F$ for lens 24 and $-F$ for lens 24') and S is the lens spacing (see FIG. 3). Thus, for example the required focal length of $L/2=10$ meters could be obtained by rigidly positioning two $F=600$ mm focal length lenses (one concave and one convex) spaced by $S=36$ mm.

We define an accuracy parameter $\epsilon$ for the optical spot location measurement in linear scale, at the output retinal plane. Referring back to FIG. 2, note that the retinal location of the spot corresponds to $2\Delta_m$, which is equal to the second difference of x-values. Hence, by analogy with equation (2), the accuracy $\Delta U_m$ in measurement of mechanical curvature is given by $$\Delta U_m = \frac{\epsilon}{L^2} \quad (6)$$

For the purposes of discussion, assume that the error in wavefront curvature is entirely due to the error in mechanical curvature (see equation 4). Then a fractional error in curvature measurement, $\delta$, is evaluated as follows:

$$\delta = \frac{\Delta U_m}{U_a} = \epsilon \cdot \frac{R}{L^2} \quad (7)$$

Since target range R is calculated as the reciprocal of the curvature U, $\delta$ is also approximately the fractional error in R. Hence, from (7) the required optical precision is given by:

$$\epsilon = \frac{L^2 \cdot \delta}{R} \quad (8)$$

Figure 5:
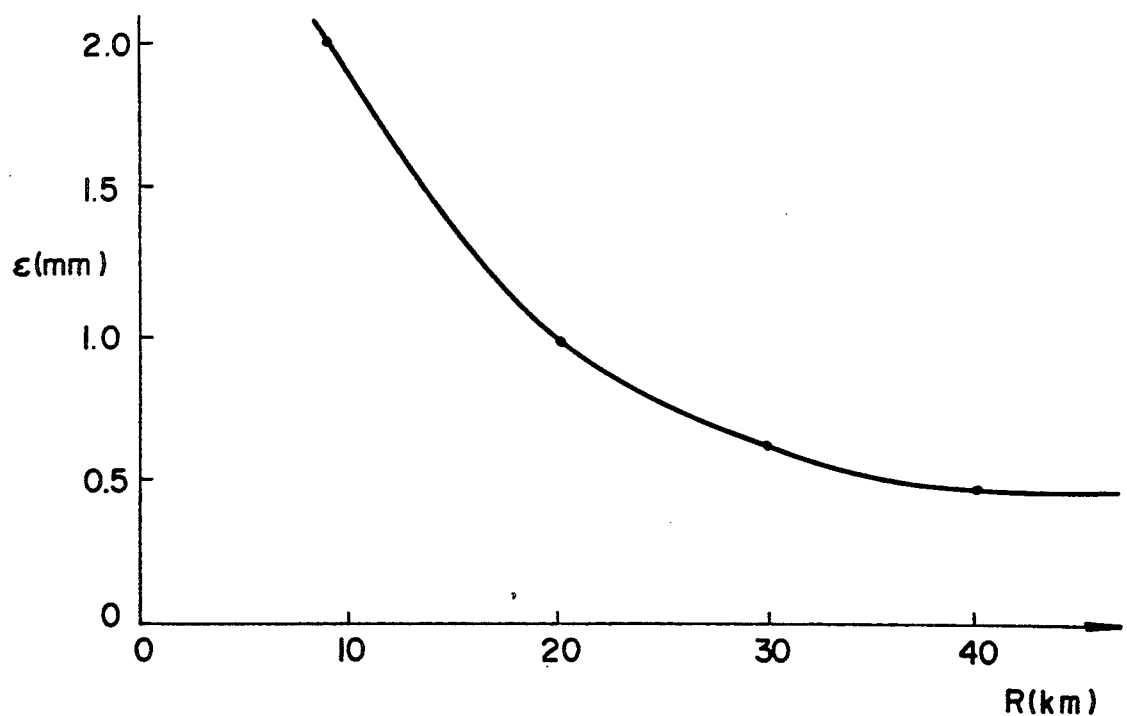
FIG. 5 is a graph illustrating the degree of optical precision required for measurement of range utilizing the method and apparatus of the present invention.

Consider the following typical values as an example: $L=20$ meters and $\delta=5\%=0.05$. From equation (8) $\epsilon$ (millimeters)$=20/R$ (kilometers). A graph of this result is shown in FIG. 5, wherein the required optical precision $\epsilon$ (in millimeters) is plotted as a function of target range R (in kilometers).

We now relate accuracy to optical diffraction effects by noting that, with a relatively small lens 24 in a diffraction-limited system, it is well known that the size of a focused image spot cannot be less than the diameter $d_s$ of the diffraction-limited focused spot, or $$d_s = \frac{\lambda_o \cdot L}{D} \quad (9)$$

where D=diameter of imaging lens (see FIG. 4).

The optical precision in the retinal plane will be a factor $\gamma$ smaller than the diffraction spot. This is achieved by insuring that the spot spans several retinal pixels so that accurate interpolation is possible. The factor $\alpha$ specifies the improvement in accuracy that the interpolation provides compared to the spot size. Thus equation (9) multiplied by $\gamma$ produces the optical precision $\epsilon$. Combining this with equation (8) one has $$\epsilon = \frac{\gamma \cdot \lambda_o \cdot L}{D} = \frac{L^2 \cdot \delta}{R} \quad (10)$$

or $$D = \frac{R \cdot \lambda_o}{L} \cdot \frac{\gamma}{\delta} \quad (11)$$

In the previous example, if $\delta = 1/5$ and $\lambda_o = 0.5 \times 10^{-6}$ meters (green light) and $R=20$ kilometers, then the required diameter is calculated as 2 millimeters. There is considerable design margin in the system, which one would exploit by using a larger lens diameters. As a practical matter, a lens diameter on the order of 50 mm, with the attendant requirement for a 50 mm diameter clear line of sight should not present any space difficulties.

To determine the field of view of the retina, i.e. its width in either dimension, define a number N of retinal pixels in width W (i.e. the number of individual detector sites in either retinal dimension), and the number $n_s$ of retinal pixels spanned by an optical diffraction spot of diameter $d_s$. It will be seen that the ratio $N/n_s$ is the number of diffraction spot sizes in the retinal width W, and thus the optical precision $\epsilon$ is given, in alternative terms, as $$\epsilon = \frac{\gamma \cdot W}{\left[\frac{N}{n_s}\right]} \quad (12)$$

From equations (8) and (12), one can derive that $$N = \frac{\gamma \cdot W \cdot R \cdot n_s}{\delta \cdot L^2} \quad (13)$$

It should be recognized that retinal array width W does not have to be the actual size of the retina, nor does W/N have to be the actual pixel size, since these metrics can be scaled by optical magnification in front of the retina. This magnification would be supplied by a relay optic means (not shown) which images a virtual retinal plane near the actual retina into the physical retina. The numbers N and $n_s$ are invariant under this magnification. The dimension W in equation (13) refers to the virtual size before magnification, and thus can be adjusted to any value desired for a particular use. The virtual size W of the retina corresponds to the total hull distortion that can be accommodated by the system 20.

Using the previous example, and making the additional assumptions that W=10 cm. and $n_s=5$, one can calculate, from equation (13), that N=100. Thus a modest and rather typical CID retina of 128×128 pixels provides the required performance. The diffraction spot may span more or less than 5 retinal pixels for optimum interpolation. Each use may require that the optimum number $n_s$ be found to give the highest overall accuracy.

If the diffraction spot 30 or 30' is allowed to become so small that it spans one pixel or less, then effective interpolation is not possible, and the optical precision has to be taken as the (virtual) pixel size itself. In this case equation (13) is modified to $$N = \frac{W \cdot R}{\delta \cdot L^2} \quad (13')$$

and the number of required pixels in the example remains the same, since, coincidentally, the assumed product $n_s=1$.

A final consideration is light level. With an imaging lens 24 of aperture D, at a distance L from light source 22, the light beam 28 is collected over a solid angle of $$\Omega = \left[\frac{\pi}{4}\right] \cdot \frac{D^2}{L^2} \quad (14)$$

which, assuming D=1 cm, implies a solid angle of $2 \times 10^{-7}$ steradians. In a typical CID camera, saturation is represented by 10 lumens/meter², which is equivalent to 0.02 watts/meter². The pixel size is typically 25 microns. Therefore, the light $L_p$ per pixel required for saturation can be calculated as $$L_p = 0.02 \times (25 \times 10^{-6})^2 = 1.25 \times 10^{-11} \text{ watts}$$

If the majority of the collected light is delivered to the brightest pixel, the total light radiance I from the light source required for CID saturation is $I = 1.25 \times 10^{-11}/2 \times 10^{-7} = 6.4 \times 10^{-5}$ watts/steradian. Bright LEDs are available that emit on the order of one candle, corresponding to a radiance of $1.6 \times 10^{-4}$ watts/steradian; a margin of over 2 above saturation appears to be available. Typical dynamic range of a CID is on the order of 40 dB. Hence a 46 dB margin over minimum required light can be provided. Moreover, if additional spreading over many pixels, or the use of a smaller imaging lens, reduces this margin to unacceptable levels, a laser diode can be used for light source 24; a laser diode typically emits a radiance of 0.02 watts/steradian. This would provide another factor of 100 (i.e. 20 dB) increase compared to the LED. Thus, light levels well within the increments which will provide high S/N CID operation are provided, even with the use of a LED.

It is expected that initial calibration of the system would be accomplished with the vehicle at dry dock or dockside. Here the three stations would be aligned, so that nominally, the image of the light source at the first station, as imaged by the optics at the third station, would fall in the center of the detector array at the second station, where the first and second stations are at the ends of the system, and the third station containing the imaging optics is at the midpoint.

True calibration would be accomplished by a sea test, under controlled conditions. An acoustic source would be used as a calibration test signal, at a fairly typical operating range (many kilometers). The range of this test source would be known exactly. From this data, the true wavefront curvature can be calculated. Also a "mechanical" curvature would be derived from the image position data from the optical system. Finally an "indicated" curvature would be obtained from the second phase difference of the test acoustic signal as received by the three arrays of the Wide Aperture Array system.

A "calibration curvature offset" can now be derived from the above data by use of the following formula:

$$U_T = U_a + U_m + U_c$$

where
$U_T$ = True curvature of acoustic wavefront from known source
$U_a$ = Indicated (acoustic signal derived) curvature
$U_m$ = Mechanical (optically derived) offset
$U_c$ = Calibration curvature offset The value of $U_c$ would be added to all subsequent measurements to derive true range from $U_a$, which is obtained as the second phase difference of the acoustic signal, and $U_m$, which is obtained from the optical data.

It should be noted that the value of $U_c$ may be both acoustic frequency sensitive, and acoustic bearing angle sensitive. Thus, the value of $U_c$ may have to be kept as a interpolated value from a look-up table, or fitted equations. This data would be derived from a thorough coverage of all operating conditions in the calibration test.

While one presently preferred embodiment of a method and apparatus for optical calibration of a wide-aperture (sonar) array has been described in some detail herein, many modifications or variations will now become apparent to those skilled in the art. It is our intent, therefore, to be limited only by the scope of the appending claims, and not by the specific details and instrumentalities presented by way of explanation of the presently preferred embodiment described herein.

What is claimed is:

1. A method for calibration of a wide-aperture array of at least three sensors initially located at known locations along a known line, comprising the steps of:
   (a) providing a beam of energy linearly propagating from a first location, having a fixed relationship with a first one of the sensors, which is located at a first end of the known line;
   (b) focusing, via means near a middle location along the line, the energy beam to a second location, having a fixed relationship with a second one of the sensors, which is located at a known line second end opposite to the first end;

(c) measuring a deviation of the energy beam from the second location, due to any change induced in the locations of the at least three sensors of the array; and (d) modifying a curvature found for any incoming energy received by the array sensors, to correct for the measured deviation.

2. The method of claim 1, wherein step (a) includes the step of providing a beam of optical energy from the first location.

3. The method of claim 2, wherein step 1(b) includes the step of providing at least one optical lens for focusing the optical energy beam at the second location.

4. The method of claim 3, further comprising the step of locating a selected point of the at least one lens at a location having a fixed relationship with a third one of the sensors, which is located along the known line and at a selected point substantially midway between the first and second ends.

5. The method of claim 4, wherein step 1(c) includes the step of providing an optical sensor at the second location to measure the deviation of the optical beam from an expected focal point at the second location along the known line.

6. The method of claim 5, wherein the optical sensor is a retinal array of optical-energy-sensing cells, and further comprising the step of interpolating the position of impingement of the optical beam upon the retinal array cells to achieve positional resolution less than the size of any cell.

7. The method of claim 3, wherein step 1(b) includes the steps of: providing a compound lens having first and second lens of the same individual focal length F but opposite polarity; and spacing the first and second lens by a selected distance S to give a required effective focal length $F_E = F^2/S$.

8. The method of claim 7, wherein the known line is essentially straight, and including the step of establishing a distance L between the first and middle locations to be essentially equal to a distance L' between the middle and second locations.

9. The method of claim 2, further including the step of substantially excluding external optical energy from a volume connecting the first and second locations.

10. Apparatus for calibration of a wide-aperture array of at least three sensors initially located at known locations along a known line, comprising:

means for providing a beam of energy from a first location, having a fixed relationship with a first one of the sensors, which is located at a first end of the known line;

means, near a middle location along the line, for focusing the energy beam at a second location, having a fixed relationship with a last one of the sensors, which is located at a known line second end opposite to the first end; and means for measuring a deviation of the energy beam from the second location, due to any change induced in the locations of the at least three sensors of the array, to allow modification of a curvature found for any incoming energy received by the array sensors, to correct for the measured deviation.

11. The apparatus of claim 10, wherein the beam is comprised of optical energy.

12. The apparatus of claim 11, wherein the optical beam providing means is a selected one of a LED and a CW laser diode.

13. The apparatus of claim 11, wherein the optical beam measuring means is a retinal array of optical-energy-sensing cells.

14. The apparatus of claim 13, wherein the retinal array is adapted to facilitate interpolation of the position of impingement of the optical beam upon the retinal array cells to achieve positional resolution less than the size of any cell.

15. The apparatus of claim 13, wherein the focusing means includes at least one optical lens for focusing the optical energy beam substantially upon the retinal array.

16. The apparatus of claim 15, wherein a selected point of the at least one lens is positioned at a location having a fixed relationship with a third one of the sensors, which is located along the known line and at a selected point substantially midway between the first and second ends.

17. The apparatus of claim 16, wherein the at least one lens is a compound lens having first and second lens of the same individual focal length F but opposite polarity, with the first and second lens being spaced apart by a selected distance S to give a required effective focal length $F_E = F^2/S$.

18. The apparatus of claim 11, wherein the beam-providing means is essentially rigidly affixed to a phase center of the first array sensor, the deviation-measuring means is essentially rigidly affixed to a phase center of the second array sensor, and the focusing means is essentially rigidly affixed with respect to a phase center of another array sensor at a middle location initially causing the known line to be essentially straight and with a distance L between the first and middle locations to be essentially equal to a distance L' between the middle and second locations.

19. The apparatus of claim 11, further comprising shroud means for substantially excluding external light from the optical path between the beam-providing means and the measuring means.

20. The apparatus of claim 10, wherein the array sensors receive sound energy for determining a range to an external source.

* * * * *